US008797402B2

(12) United States Patent
Said et al.

(10) Patent No.: US 8,797,402 B2
(45) Date of Patent: Aug. 5, 2014

(54) METHODS AND APPARATUS FOR IMAGING AND DISPLAYING A NAVIGABLE PATH

(75) Inventors: Amir Said, Cupertino, CA (US); Debargha Mukherjee, San Jose, CA (US); Ullas Gargi, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2339 days.

(21) Appl. No.: 10/300,103

(22) Filed: Nov. 19, 2002

(65) Prior Publication Data

US 2004/0098175 A1 May 20, 2004

(51) Int. Cl.
*H04N 7/00* (2011.01)
*H04N 7/18* (2006.01)

(52) U.S. Cl.
USPC .......................................... 348/119; 348/121

(58) Field of Classification Search
USPC ......... 348/113, 115, 116, 118, 119, 121, 122, 348/123, 124; 701/211, 1
See application file for complete search history.

(56) References Cited

U.S. PATENT DOCUMENTS

| | | | |
|---|---|---|---|
| 5,296,884 A | 3/1994 | Honda et al. | |
| 5,422,814 A | 6/1995 | Sprague et al. | |
| 5,596,494 A | 1/1997 | Kuo | |
| 5,613,055 A * | 3/1997 | Shimoura et al. | 345/473 |
| 5,642,285 A | 6/1997 | Woo et al. | |
| 5,684,937 A | 11/1997 | Oxaal | |
| 5,712,899 A | 1/1998 | Pace, II | |
| 5,726,660 A | 3/1998 | Purdy et al. | |
| 5,864,632 A | 1/1999 | Ogawa et al. | |
| 5,867,804 A | 2/1999 | Pilley et al. | |
| 5,926,116 A | 7/1999 | Kitano et al. | |
| 5,945,985 A | 8/1999 | Babin et al. | |
| 5,948,040 A | 9/1999 | DeLorme et al. | |
| 5,999,124 A | 12/1999 | Sheynblat | |

(Continued)

FOREIGN PATENT DOCUMENTS

| | | |
|---|---|---|
| EP | 1054331 | 11/2000 |
| EP | 1128284 | 8/2001 |

(Continued)

OTHER PUBLICATIONS

Kolojejchick et al., Information appliances and tools in Visage, Computer graphics and Applications, Jul.-Aug. 1997, IEEE vol. 17, Issue 4, pp. 32-41.

(Continued)

*Primary Examiner* — Lin Ye
*Assistant Examiner* — Chriss Yoder, III

(57) ABSTRACT

Various methods for imaging and navigating a selected path are described. A method of navigating a path includes the step of identifying a selected path. At least one image stream associated with navigating the selected path is identified. The displayed image stream includes visual information corresponding to traveling the selected path. In one embodiment, display of the image stream is varied in accordance with an actual location and a speed of a traveler along the selected path. Various single pass and multi-pass systems are described for capturing the visual information associated with a path. One method of acquiring visual information includes generating first and second image streams comprising visual information representing traversal of the path. Audio cues are recorded at the same plurality of locations on each pass. The audio cues permit synchronization of the image streams to locations along the path.

10 Claims, 8 Drawing Sheets

(56) References Cited

U.S. PATENT DOCUMENTS

| | | | |
|---|---|---|---|
| 5,999,882 A | | 12/1999 | Simpson et al. |
| 6,008,808 A | | 12/1999 | Almeida et al. |
| 6,018,697 A | * | 1/2000 | Morimoto et al. ............ 701/411 |
| 6,023,278 A | | 2/2000 | Margolin |
| 6,088,654 A | | 7/2000 | Lepere et al. |
| 6,139,433 A | | 10/2000 | Miyamoto et al. |
| 6,144,375 A | | 11/2000 | Jain et al. |
| 6,148,260 A | | 11/2000 | Musk et al. |
| 6,173,239 B1 | | 1/2001 | Ellenby |
| 6,182,010 B1 | * | 1/2001 | Berstis ......................... 701/441 |
| 6,195,122 B1 | * | 2/2001 | Vincent ......................... 348/169 |
| 6,282,362 B1 | | 8/2001 | Murphy et al. |
| 6,285,317 B1 | * | 9/2001 | Ong ........................ 342/357.13 |
| 6,288,704 B1 | * | 9/2001 | Flack et al. .................... 345/158 |
| 6,317,690 B1 | | 11/2001 | Gia |
| 6,321,158 B1 | * | 11/2001 | DeLorme et al. ............. 701/201 |
| 6,337,688 B1 | * | 1/2002 | Berstis ......................... 345/473 |
| 6,360,168 B1 | | 3/2002 | Shimabara |
| 6,504,571 B1 | | 1/2003 | Narayanaswami et al. |
| 6,564,263 B1 | | 5/2003 | Bergman et al. |
| 6,611,753 B1 | * | 8/2003 | Millington .................... 701/209 |
| 6,636,803 B1 | | 10/2003 | Hartz et al. |
| 6,683,609 B1 | | 1/2004 | Baron et al. |
| 6,895,310 B1 | * | 5/2005 | Kolls ............................... 701/1 |
| 6,903,763 B1 | * | 6/2005 | Noguchi et al. ......... 348/207.99 |
| 6,904,160 B2 | | 6/2005 | Burgess |
| 7,239,760 B2 | * | 7/2007 | Di Bernardo et al. ........ 382/305 |
| 2001/0022621 A1 | | 9/2001 | Squibbs |
| 2001/0023390 A1 | | 9/2001 | Gia |
| 2002/0010543 A1 | | 1/2002 | Watanabe et al. |
| 2002/0011951 A1 | | 1/2002 | Pepin et al. |
| 2003/0024975 A1 | | 2/2003 | Rajasekharan |
| 2004/0041999 A1 | | 3/2004 | Hogan et al. |
| 2004/0061726 A1 | | 4/2004 | Dunn et al. |
| 2005/0012743 A1 | | 1/2005 | Kapler et al. |

FOREIGN PATENT DOCUMENTS

| | | |
|---|---|---|
| EP | 1133150 | 9/2001 |
| EP | 1139116 | 10/2001 |
| EP | 1139681 | 10/2001 |
| EP | 1146467 | 10/2001 |
| EP | 1158822 | 11/2001 |
| WO | WO9821688 | 5/1998 |
| WO | WO9854896 | 12/1998 |
| WO | WO9918732 | 4/1999 |
| WO | WO0072577 | 11/2000 |
| WO | WO0144978 | 6/2001 |
| WO | WO0154021 | 7/2001 |
| WO | WO0163479 | 8/2001 |
| WO | WO0233955 | 4/2002 |

OTHER PUBLICATIONS

What visage-Link can do, Http://www.maya.com/visage/link/shar_reg.html, 1997.

Hewlett-Packard: "MediaBeads: An Architecture for Path-Enhanced Media Applications" www.hpl.hp.com, online! Jun. 30, 2004, XP002304362 Taipei, TW.

Alison Brown, Navsys Corporation: "Smart Camera for Precise Mapping and Targeting" www.nasatech.com, online! Sep. 1998, XP002304364.

www.afds.net: "Red Hen Systems, Inc-Media Mapper" www.afds.net, online! Oct. 28, 2004, XP002304366.

J K Berry, K Burgess: "Practical Applications of Video Mapping in Natural Resources" GEO World, online! Jul. 4, 2002, XP002304367.

XeQute Software: "Smart Pxi Manager v. 6.0" Internet Article, online! Nov. 27, 2002, XP002304363.

BK Smith et al: "Inquiry with Imagery: Historical Archive Retrieval with Digital Cameras" www.media.mit.edu, online! 1999 XP002304365.

Welcome to MediaMapper.com Red Hen Systems, Jan. 24, 2002, pp. 1-12.

MediaMapper Multimedia Map Creator, MediaMapper.com, last updated Jan. 24, 2002, pp. 1-12.

Qualcomm and Autotrac of Brazil Join to Bring OmniTRACS Mobile Information Management System to Argentina, PR, Newswire, New York, Aug. 24, 1999, pp. 1-3.

Smith et al, Geographic Information Systems and Libraries: Patrons, Maps, and Spatial Information, Papers presented at the 1995 Clinic on Library Applications of Data Process, pp. 80-121.

Smith, T.R., A Digital Library for Geographically Referenced Materials, IEEE Computer, 1996, pp. 54-60.

Christel et al. "Interactive Maps for a Digital Video Library," IEEE Multimedia, 2000, pp. 60-67.

http://www.nikon-image.com/ebg/news_release/2001/d1xhnr.pdf, Feb. 5, 2001.

* cited by examiner

METHODS AND APPARATUS FOR IMAGING AND DISPLAYING A NAVIGABLE PATH

FIELD OF THE INVENTION

This invention relates to the field of navigational tools. In particular, this invention is drawn to aiding a traveler navigate a path.

BACKGROUND OF THE INVENTION

Traditional maps provide a two dimensional birdseye view of roads, streets, and highways. Typically such maps include a limited set of geographic features such as lakes and rivers or manmade features such as the location of a railroad or other landmarks that aid in navigation.

Navigational systems relying upon databases based on such maps may highlight a point-to-point path that permits the user to better locate the desired path within a larger map of paths. Some navigational systems provide the user with a series of instructions regarding the path to be taken.

Although such navigation systems offer numerous benefits, this type of information does not necessarily enable the user to readily relocate to the starting point of the selected path without additional information. In addition, the textual information such as the distance between one point and the next point requires the user to monitor the odometer and perform computations in order to locate the next point. Thus one disadvantage of such navigational systems is that the user may not be able to readily correlate the user's actual position with a position on the selected path.

SUMMARY OF THE INVENTION

In view of limitations of known systems and methods, various methods for imaging and navigating a selected path are described.

One method of navigating a path includes the step of identifying a selected path. At least one image stream associated with navigating the selected path is identified. The displayed image stream includes visual information corresponding to traveling the selected path.

Another method of navigating a path includes the step of identifying a selected path. A sequence of image streams corresponding to traveling the selected path is identified. Each image stream includes visual information associated with traversing the selected path. The sequence of image streams is displayed in sequential order.

Another method of navigating a path includes the step of providing at least one image stream corresponding to a selected path. The image stream includes visual information associated with traversing the selected path. A first position corresponding to a current position is identified within the image stream. A second position corresponding to a desired position is identified within the image stream. The image stream is re-positioned to the second position for display if a difference between the first and second positions exceeds a pre-determined threshold. In one embodiment, the frame rate of display of the image stream is varied in accordance with the speed of the user along the selected path.

Various single pass and multi-pass systems are described for capturing the visual information associated with a path. One method of collecting visual information for a navigable path includes the step of traversing a network of path segments connected to nodes, wherein each path segment is traversed at least once. Visual information associated with each path segment is captured while traversing that path segment.

Another method of acquiring visual information about a navigable path includes the step of generating a first image stream comprising visual information representing traversal of a path on a first pass. Audio cues are recorded at a first plurality of locations while traversing the path on the first pass. A second image stream comprising visual information representing traversal of the path on a second pass is generated. Audio cues are recorded at a second plurality of locations while traversing the path on the second pass. The second plurality of locations is substantially the same as the first plurality of locations. The audio cues permit synchronization of the image streams to locations along the path.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A map can be described as a plurality of nodes connected by a network of segments. There may be more than one route for traveling from an initial node to a destination node. A cost function can be assigned to value each possible route depending upon criteria preferred by the user such as minimum distance, maximum speed, minimum time, maximizing highway segments, minimizing highway segments, etc. The term "path" refers to a route comprising at least one segment or a plurality of sequentially connected segments connecting an initial node to a destination node. A path is thus a subset of the map.

Each node can be an information node, a decision node, or both. A decision node indicates that more than one segment can be selected for travel at that node location. An information node may include information about buildings, landmarks, etc., along the path such as gas stations, post offices, grocery stores, coffee shops, etc. or other geographic or demographic information about the geographic area local to the node that would be useful to a traveler. In one embodiment, an information node includes latitude and longitude co-ordinates for the location associated with the information node.

In order to aid navigation, the traveler may be provided with visual information associated with a selected path. For example, the traveler or user may be presented with a stream of images (i.e., image stream) previously recorded by a prior traveler of the route. Some users may find the sequence of images provided by the image stream useful in correlating their actual geographic position with their position on a map and ensuring that they are actually on their desired path.

Figure 1:
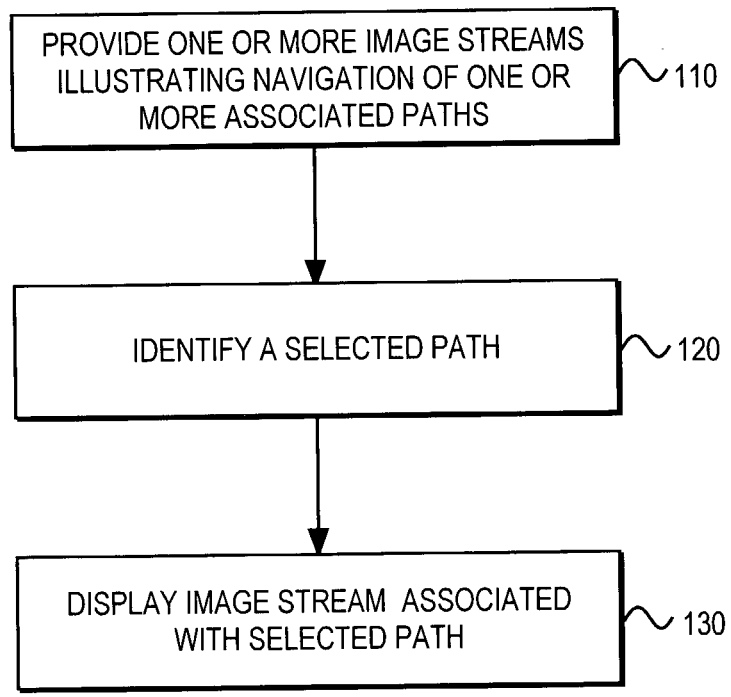
FIG. 1 illustrates one embodiment of a method of selecting and displaying an image stream associated with navigating a selected path.

FIG. 1 illustrates one embodiment of a method of selecting and displaying an image stream associated with navigating a selected path. One or more image streams illustrating navigation of one or more associated paths are provided in step 110. A selected path is identified in step 120. The image stream(s) corresponding to the selected path is presented in step 130.

The image streams include visual information associated with traveling the selected path. The image streams may include actual imagery captured from a prior transversal of the selected path. The image streams may include artistically rendered images mimicking the actual imagery. The image streams provide a traveler or user with visual cues about the path that permit travelers to confirm that they are on the intended path and as well as their location along the selected path during transit. The traveler thus receives information that serves as visual feedback for navigation.

In one embodiment, each navigable path may have a single associated image stream. Alternatively, a plurality of distinct image streams may be associated with each navigable path. The use of distinct image streams permits, for example, selection of different views of the same selected navigable path by selecting different streams. The views may include a birdseye view of the path, an observer's view while traveling the path, varying levels of detail about the path, or different image resolutions, for example.

The user may identify the selected path by selecting a graphically presented portion of the path. In one embodiment, the user selects a start node and a destination node which serve to identify the selected path. In some applications only the destination needs to be identified in order to select the path. In one embodiment, the start or destination nodes may be directly identified by their physical locations (e.g., subway) or indirectly identified through the goods or services associated with the location (e.g., hospitals, universities) or other attributes of the location (vendor location).

The image stream associated with the selected path may be presented to the user in a number of ways. Generally, the manner of presentation may be dependent upon whether the device presenting the image stream is accompanying the user during transit or not.

If the image stream(s) are displayed on a device that is not traveling with the user (e.g., a kiosk), the user views the image stream before traveling the path. The user is thus limited to previewing the path to be traveled or perhaps viewing a path previously traveled, but viewing an image stream of the path while traveling is not possible.

Alternatively, the image stream may be displayed on a device traveling with the user such as a cellular telephone, portable digital assistant (PDA), a vehicular navigation system, or a wireless device. This permits the user to view the image stream of the selected path while traveling. The user may be provided with control of the presentation. For example, in one embodiment the user controls the playback speed, view (birdseye, traveling observer, resolution), zoom, pan, whether to replay, etc.

In order to provide a user with visual cues for the path to be mapped or traveled, the visual information must be acquired. A number of techniques for acquiring the visual information are presented.

Collecting visual information for every possible path between any two nodes is impractical for a map of any size. Instead, sufficient visual information is collected or generated so that a subset of the collected visual information can be used to construct a visual path between any two nodes.

Figure 2:
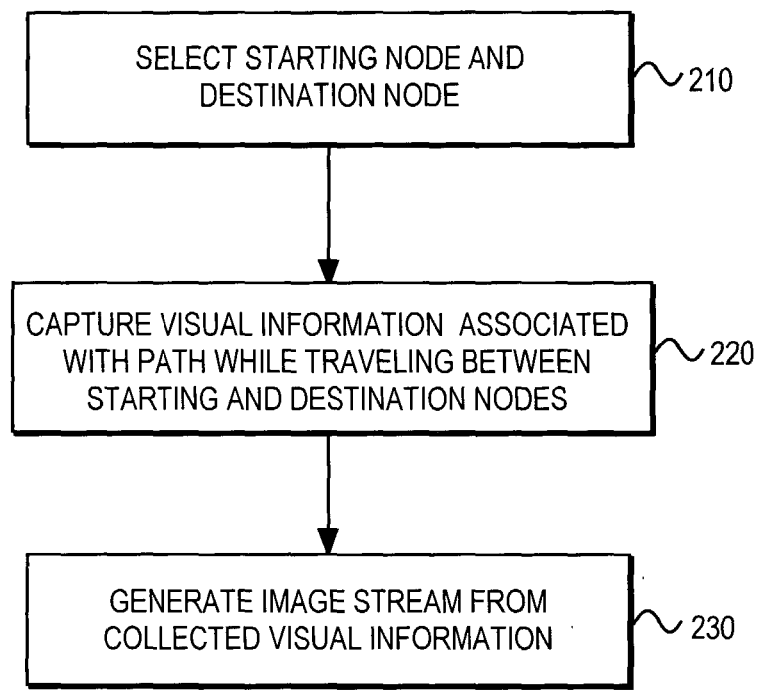
FIG. 2 illustrates one embodiment of a method of generating an image stream associated with a navigable path.

FIG. 2 illustrates one embodiment of a method of capturing the visual information. A starting node and a destination node are selected in step 210. Visual information associated with the path is captured while traveling the path between the starting and destination nodes in step 220. In one embodiment, an image stream corresponding to continuous visual information along the path is generated in step 230.

The image stream may include panoramic (360°) views. Alternatively, an image stream consisting of a set of still images limited to a number of locations along the path is generated. The still images include easily recognizable landmarks for the user in one embodiment.

Figure 3:
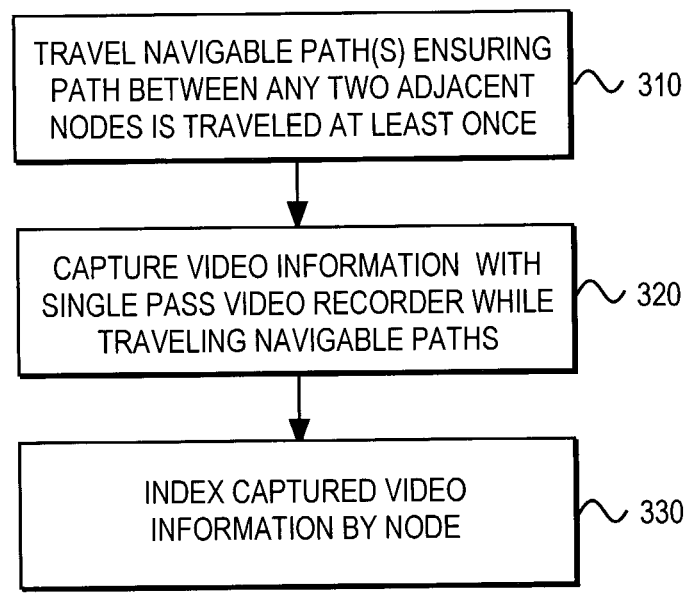
FIG. 3 illustrates a method of acquiring visual information about a navigable path with single pass video capture systems.

FIG. 3 illustrates a method of acquiring visual information about a navigable path using single pass video capture systems. In step 310, the navigable path(s) are traveled. In order to collect sufficient information to permit navigating any portion of the network of paths, the path between any two adjacent nodes must be traveled at least once. Once traversed, the path between adjacent nodes need not be traversed again unless it is necessary to do so in order to ensure that the entire network of paths is traversed at least once.

While traversing the network of paths, the video information is captured with a single pass video recorder system in step 320. The resulting collection of video information may be indexed by node in step 330. In one embodiment, the image stream is indexed by position with a co-ordinate framework such as latitude and longitude co-ordinates. Such positioning information may be acquired, for example, by utilizing the Global Positioning System (GPS) to determine latitude and longitude while recording the video information.

Figure 4:
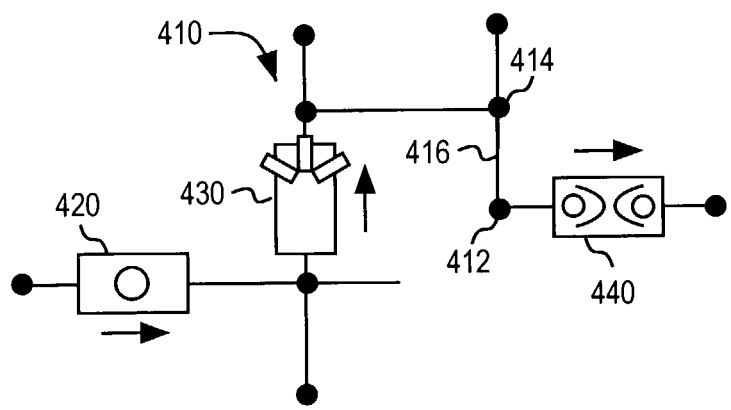
FIG. 4 illustrates various types of video recorders for acquiring visual information about a navigable path.

FIG. 4 illustrates a network of navigable paths 410. Examples of single pass video recording systems include an omni-directional camera 420, a plurality of synchronized video recorders 430, and a pair of hemispherical cameras (e.g., bi-parabolic spherical video capture system 440). System 420 records the visual information as spherical video information. System 440 records the visual information as a separate video stream for each camera, however, the separate streams are merged into a composite spherical video stream. Presentation of visual information along a particular line of sight may require a geometric transformation to provide a planar view.

System 430 records a separate video stream for each camera. The start, stop, rate, and resolution are synchronized. The captured video streams do not collectively form an omni-directional view. Although the views are limited to a finite number of distinct views, switching views merely requires selecting a different one of the captured video streams.

As long as the entire network is captured, the particular route taken through the network 410 by the video capture system is not critical. Thus as long as the path 416 between any pair of adjacent nodes 412, 414 is captured at least once, the order in which the paths are traversed is not critical. The visual information captured is intended to reflect the visually static elements of the geographic area associated with the map.

Figure 5:
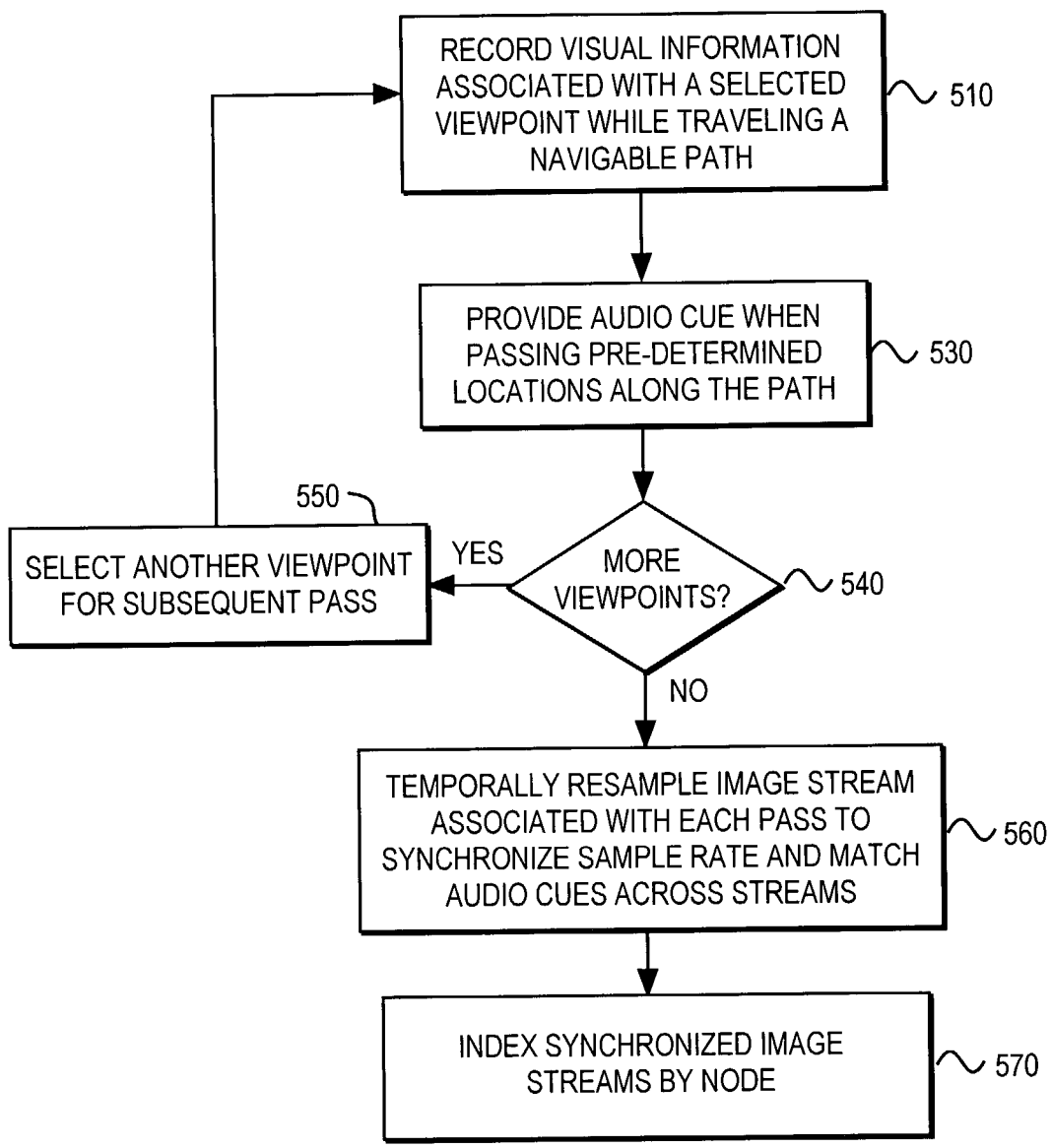
FIG. 5 illustrates a method of acquiring visual information about a navigable path with multiple pass video capture systems.

FIG. 5 illustrates a method of acquiring visual information about a navigable path using a multi-pass video capture system. A single pass system may be prohibitively expensive. As an alternative, multiple passes with a single camera positioned to different viewing angles may be used. Synchronization of the resulting multiple streams is necessary to ensure that each stream indicates different viewing perspectives from the same point along the path at a given point in time.

In step 510, visual information associated with a selected viewpoint is recorded while traveling a navigable path to produce an image stream. An audio cue is provided when passing pre-determined locations along the path in step 530. If more viewpoints are to be provided as determined by step 540, another viewpoint is selected in step 550 for a subsequent pass. Steps 510-550 are repeated until no further views are needed. Instead of an audio cue, the cue is provided in the form of positional data such as longitude and latitude. The positional data is collected at the pre-determined locations to enable synchronizing to the same location across image streams.

In step 560, the image streams are temporally resampled in order to synchronize sample rates across streams. The audio cues are used to spatially synchronize the image streams with each other. If necessary, the synchronized image streams are indexed by node in step 560.

Figure 6:
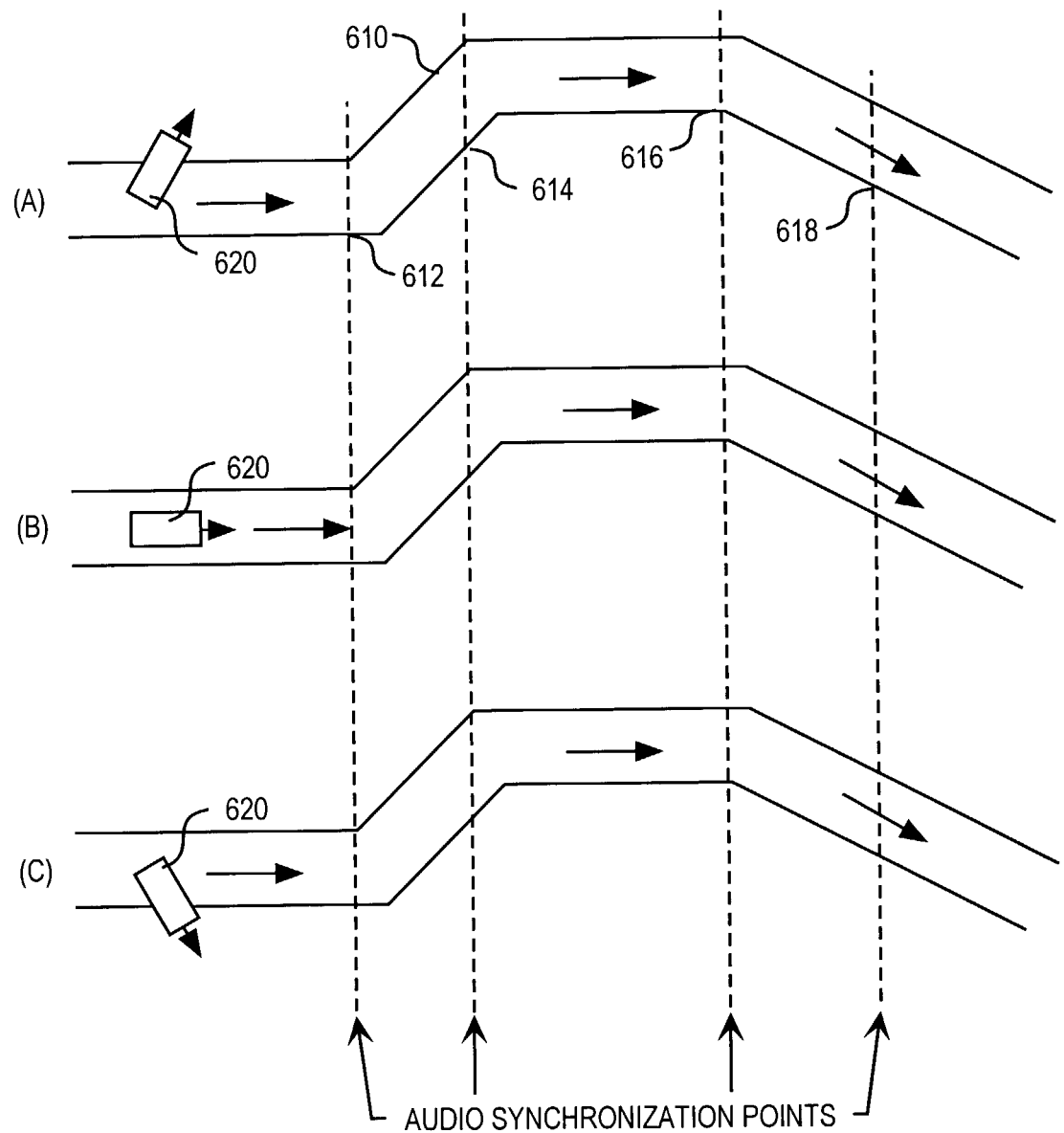
FIG. 6 illustrates application of a multi-pass approach for acquiring visual information about a navigable path.

FIG. 6 illustrates application of a multi-pass approach for acquiring the visual information. Multi-pass recording system 620 is positioned to a different viewing perspective for each pass (a)-(c) along path 610. As the recording system 620 traverses the path for a given pass, the user provides audio cues 612-618 when encountering specific locations along the path 610. For each subsequent pass, the audio cues are provided at the same point along the path. The multi-pass recording system is thus provided with audio cues that may be used to synchronize the resulting image streams spatially with respect to the traveled path.

Although the resulting image streams may be indexed by node for presentation of the appropriate image stream, the recorded audio cues may be used as an alternative index. In effect the audio cues may serve as an alternative index for the beginning, ending, and informational nodes.

The image stream nodes are associated with corresponding nodes of a map so that graphical representation of the map may be associated with the corresponding image stream associated with traveling that path. A node may be identified by an audio cue. In the event that nodes are embodied as audio cues, speech recognition software may be used to match up the audio cues with text contained in the map. In one embodiment, the image stream is indexed by positioning co-ordinates such as latitude and longitude so that the graphical representation of a map having such information can be matched up with the image streams displaying the corresponding portion of the map. The result is a graphical representation of a map comprising a plurality of nodes wherein adjacent nodes have a corresponding associated image stream.

Figure 7:
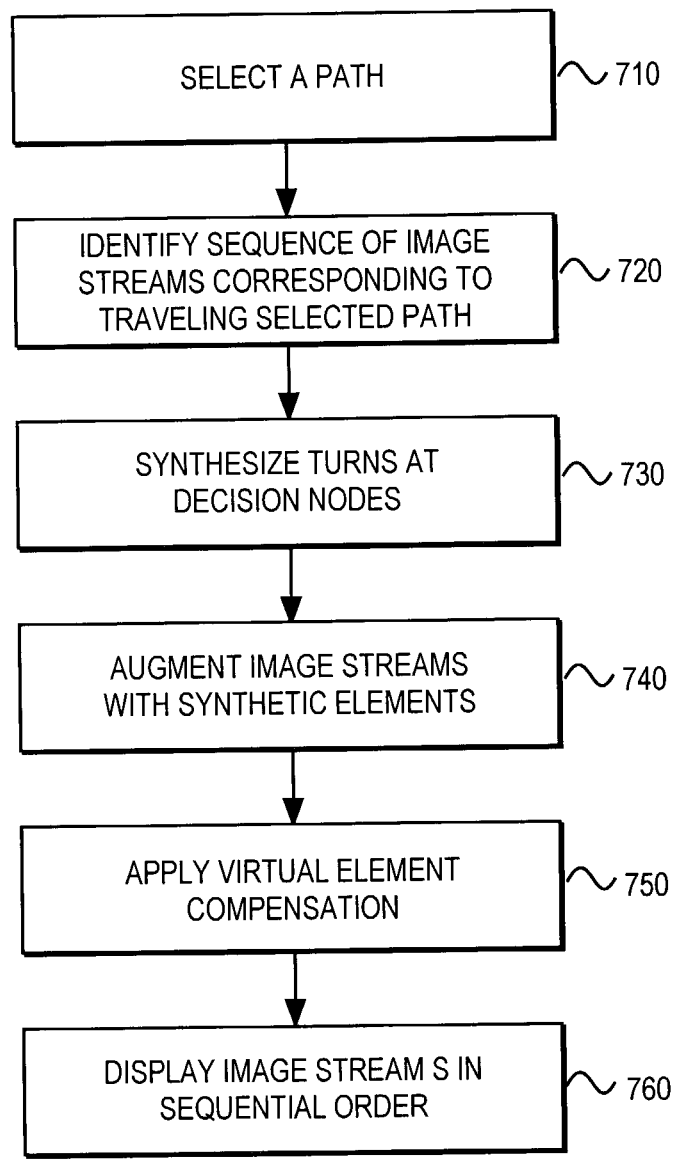
FIG. 7 illustrates one embodiment of a method of travel using image streams as navigational aides.

FIG. 7 illustrates one embodiment of a method of travel using image streams as navigational aides. In step 710, a path is selected. Path selection may be direct such as explicit identification of the path. Alternatively, the path selection may be derived by identifying a destination, or a starting location and a destination. If more than one path leads to the destination, a selected path may be identified from the possible paths by a cost function such as distance, time, type or quality of path, etc.

In step 720, a sequence of image streams corresponding to traveling the selected path is identified. Although an image stream exists for each pair of adjacent nodes along the selected path, the image stream may be discontinuous at one or more decision node. This is because the visual information between the adjacent nodes was captured, but a turn at the decision node may not have been captured. Thus mere "stitching" together of the image streams may result in significant visual discontinuity when switching from a first image stream associated with approaching a decision node from one direction to a second image stream associated with leaving the decision node in another direction.

In one embodiment, the visual discontinuities associated with distinct image streams is handled by synthesizing turns at decision nodes. Thus although the image streams are still presented in sequential order, step 730 synthesizes a turn at decision nodes between distinct image streams, if necessary, to provide for a smoother transition.

If the source image streams are captured with omni-directional cameras or recorded as spherical image data, the visual information associated with making the turn can be extracted from the source image stream. If the image streams are collected as multiple views, the visual information associated with making the turn can be synthesized by switching to different views and interpolating between views.

The image stream may be augmented with synthetic elements to further aid navigation. Synthetic elements include arrows to indicate direction, annotations of landmarks (e.g., "Post Office", "Airport", "Grocery Store", "Gas Station"), geographic markers (e.g., "due North"), descriptions (e.g., "sharp curve"), specific vendors (e.g., "Chevron", "Exxon", "McDonalds"). Synthetic elements may provide information about actual objects or elements recorded in the image stream, the synthetic elements themselves are not actually present along the path. Textual instructions for traveling the selected path such as travel distances between turns may be provided as synthetic elements. The contents of information nodes may be presented or used to generate synthetic elements. In step 740, the selected image stream(s) are augmented with synthetic elements.

The image streams necessarily capture the traveled path at a particular point in time. Although landmarks, buildings, waterways, highways, etc. tend to be somewhat static in nature, other visual information may be somewhat dynamic in nature. Lighting, for example, varies depending upon the time of day. Features such as signage, neon lights, etc. become more prominent to the viewer at night and thus the user tends to navigate by a different set of visual indicators. The weather may vary unpredictably over time. Precipitation or other conditions may contribute significantly to the appearance of the traveled path.

Given that conditions such as time of travel (e.g., day or night) or weather may significantly affect the appearance of the path while traveled, accommodations may be made to account for the differences. In one embodiment, this is accomplished by presenting image streams that are associated with a time of travel along the selected path. Thus the selection of image streams in step 710 may be based in part on time of travel. Storing image streams for multiple times of travel is costly in terms of storage.

One alternative to storing image streams for multiple times of day is to modify the presentation of the image streams to approximate travel at different times of day. In step 750, the image stream is modified using virtual elements to compensate for visual differences between the recorded image stream and the path as currently traveled.

In contrast to synthetic elements that are not present in actuality, virtual elements are intended to modify the recorded image stream to better reflect actual traveling conditions such as lighting or weather. Virtual elements are thus intended to represent or mimic visual information that is not captured in the recorded image stream but nonetheless exists when traveling the path at different point in time. Even if a one-to-one correspondence between virtual elements and any corresponding element along the path does not exist, the virtual elements collectively compensate the recorded image stream to better match current traveling conditions. The virtual elements mimic scenery to accommodate for visible changes between the recorded image stream and current conditions while traveling the path.

In one embodiment, an illumination correction process is applied to the image streams to account for time of day. Illumination correction may include varying contrast and brightness of the image streams. In one embodiment, illumination correction includes weighted interpolation between image streams captured at different times of day where the weighting is dependent upon the time of travel and the time that the image streams were recorded. Thus the image stream is modified through virtual lighting to accommodate for the differences in lighting conditions between the time the image stream was acquired and the time the traveler actually travels the path.

Virtual weather modification may be applied to accommodate for differences in weather conditions between the time the image stream was acquired and the time the traveler travels the path. Thus for example, imagery for precipitation such as hail, rain, or snow may be generated. The image stream is modified with such virtual imagery in step 750 to present the traveler with an image stream that better matches actual current traveling conditions as opposed to the conditions at the time the image stream was initially recorded. In one embodiment, weather condition data is automatically retrieved from a broadcast source to provide for automatic virtual compensation appropriate for actual traveling conditions at that time.

In step 760, the image streams are displayed in sequential order to the user with any illumination correction or synthetic element augmentation. In one embodiment, the image stream sequence is displayed independent of the user's location. In an alternative embodiment, portions of the image stream sequence are displayed depending upon the user's position on the selected path. The position of the user on the selected path may be determined, for example, by global positioning satellite.

Figure 8:
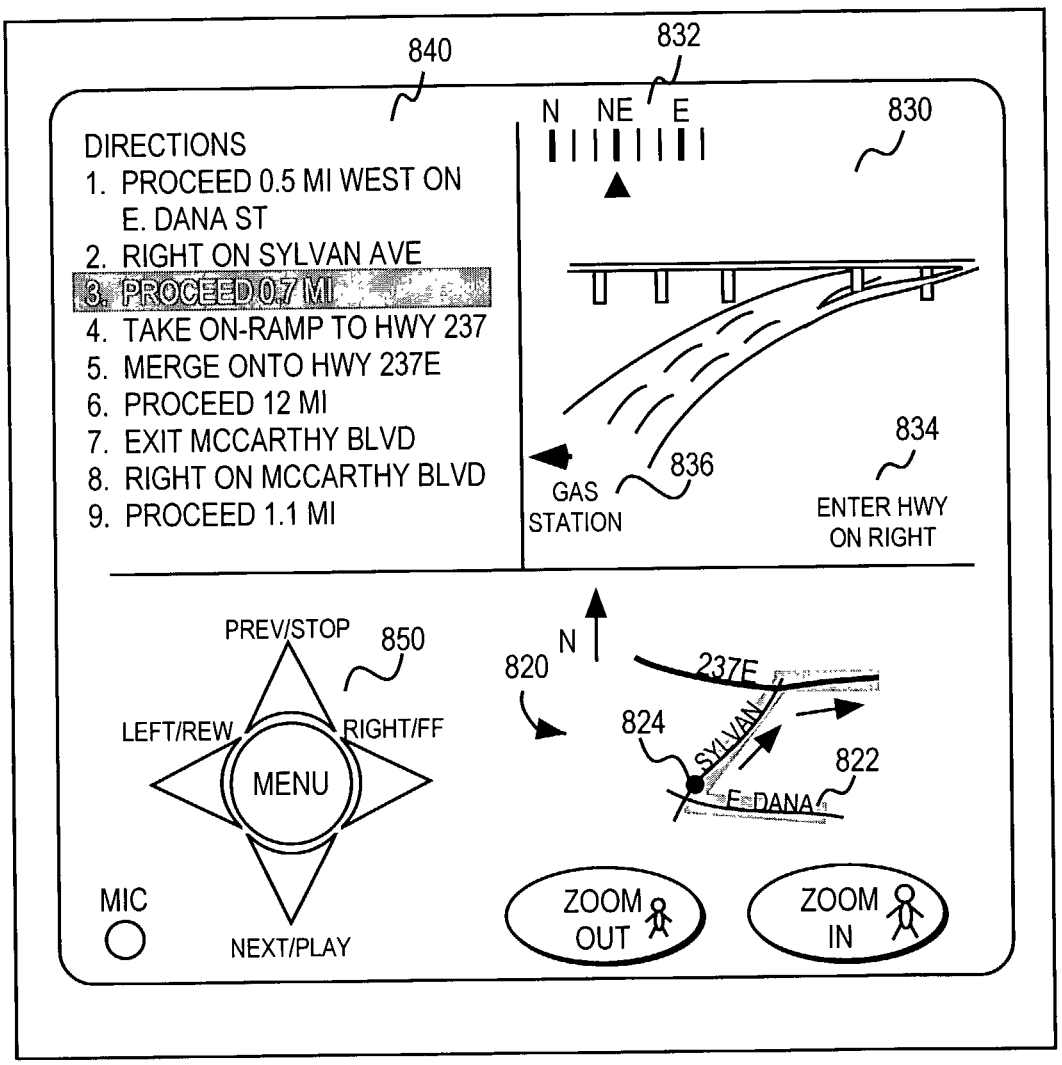
FIG. 8 illustrates one embodiment of an application of the method of FIG. 7.

FIG. 8 illustrates an application of the method of FIG. 7. Navigational display 810 illustrates a graphical representation of a map 820 and selected path 822. An image stream illustrating travel down the selected path from a selected viewpoint is provided in viewing area 830. Portions of the image stream are provided based in part on the actual position 824 of the user along the selected path 822. Presentation of the image stream is enhanced with synthetic elements such as compass heading 832, route instructions 834 ("enter hwy on right"), and text annotations 836 ("gas station"). The complete driving instructions 840 are also provided in this example. The user is given the opportunity to review or preview the selected path through the use of play, rewind, and fast forward functions accessible through the menu and selection buttons 850. The menu and selection buttons also permit the user to select a particular view as well as to establish preferences for presentation of the image stream.

In kiosk applications where the display device is stationary, the user is able to preview or review a selected path. In portable applications, however, the use of position data may optionally be used to control the presentation at least in part while the user is moving.

Some users may desire to have the presentation of the image streams controlled at least in part by their location during travel. This position feedback permits the navigation system to present the image streams in an accurate manner related to the user's true position rather than at an ungoverned manner such as at a fixed rate independent of the user's actual position during travel. The user may choose to enable controlling the display of the image stream(s) in accordance with position data In one embodiment, the navigation system has access to positioning data. The user's position may be determined, for example, from positioning data provided by the Global Positioning Satellite System. GPS receivers enable users to accurately pinpoint their location.

Figure 9:
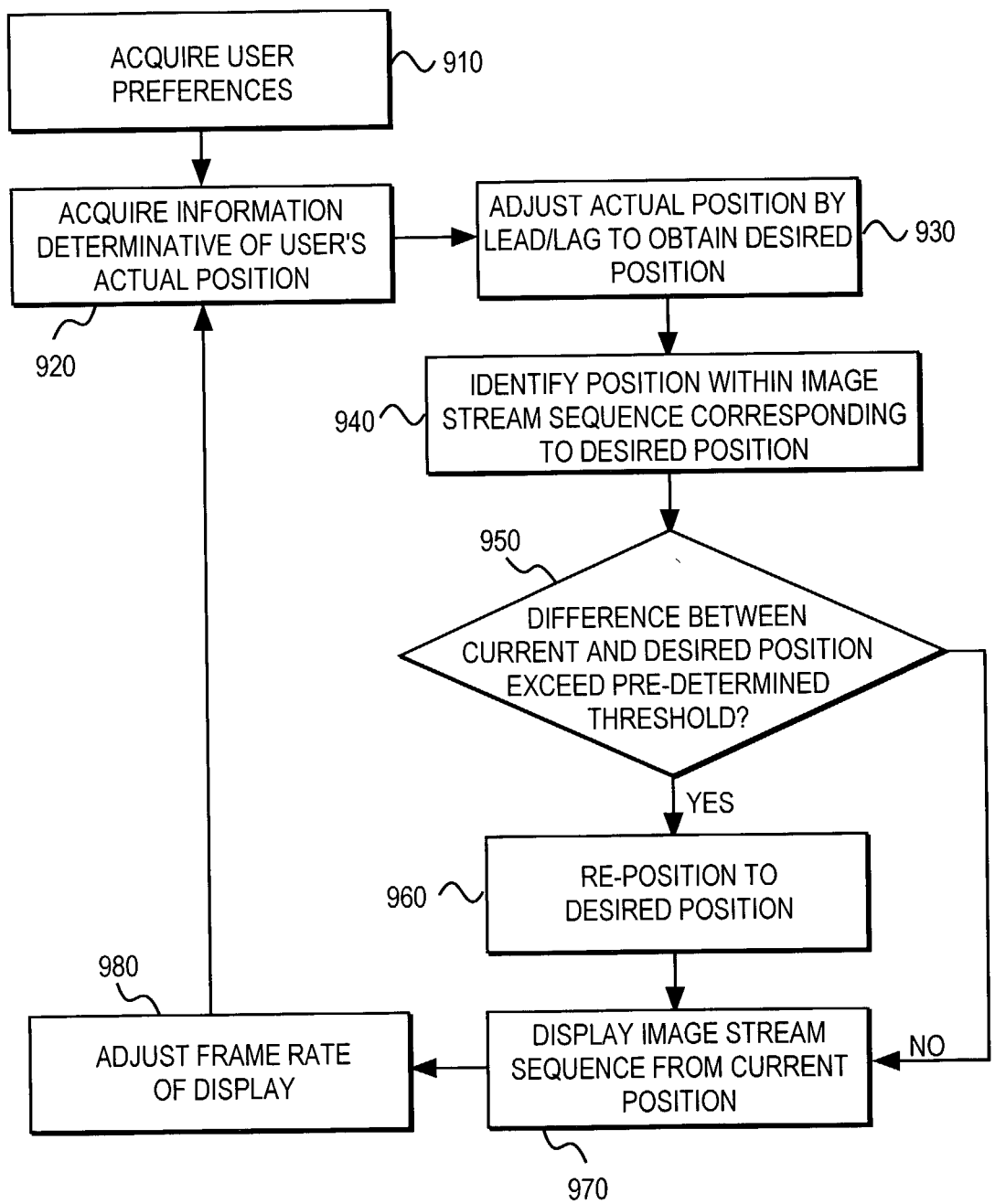
FIG. 9 illustrates one embodiment of a method of displaying an image stream associated with a selected path in accordance with an actual location and speed of travel of the user.

FIG. 9 illustrates an expansion of step 760 of FIG. 7 incorporating position data to control at least in part the presentation of the image streams. In particular, FIG. 9 illustrates one embodiment of a method of displaying an image stream associated with a selected path in accordance with an actual location and speed of travel of the user.

In step 910, the user's desired lead/lag preference is determined. In some embodiments, the user may prefer that the presented image stream reflects scenery to be encountered in a few moments or scenery passed rather than the scenery in the user's current vicinity.

In step 920, information determinative of the user's actual position is acquired. The lead/lag preference above may represent a value required to account for delays in acquiring the user's actual position. In step 930, the actual position is adjusted by lead or lag to indicate the desired position. In one embodiment, the lead or lag is nonexistent so that the actual position is the desired position.

In step 940, the location within the image stream corresponding to the desired position is determined. This may be accomplished, for example, by interpolating between information nodes containing global position data to determine the location within the image stream corresponding to the desired point.

The image stream may be presented from the desired point forward. If the image stream is currently being displayed, however, sudden jumping to the desired position in the image stream may be visually distracting, particularly if there is a significant number of frames between the position of the currently displayed frame and the desired position within the image stream. Accordingly, step 950 determines if the difference between a current position and the desired position within the image stream exceeds a predetermined threshold. If so, the image stream is repositioned so that the desired position becomes the current position in step 960. The process of adjusting the current position within the image stream(s), if necessary, is referred to as updating. The image stream is displayed from the current location in step 970.

In one embodiment, the frame rate of the image stream is adjusted in accordance with the speed of the traveler in step 980. Such adjustments effectively serve to prevent significant differences in traveling speed of the user versus that represented by the nominal frame rate of the image stream from requiring constant repositioning of the image stream.

The update process may be performed manually in response to a request by the user, or continuously while the user is navigating the path. In one embodiment, the process of acquiring position data and updating the image stream display continues, if desired, by repeating steps 920-980 until the user reaches the desired destination point.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of navigating a path comprising:
   a) identifying a selected path wherein the selected path includes at least one decision node connecting at least three path segments;
   b) identifying a sequence of image streams corresponding to traveling the selected path, wherein each image stream includes visual information between each decision node;
   c) displaying the sequence of image streams in sequential order, wherein step c) further comprises synthesizing a turn at the decision node to provide a transition between sequential image streams by switching to a different view from a current view and interpolating between the different view and the current view, wherein the different view and the current view are collected as multiple views.

2. The method of claim 1, further comprising:
   d) applying virtual element compensation to the image streams to compensate for differences in the image streams and actual appearance of the selected path.

3. The method of claim 2, wherein d) further comprises applying virtual lighting compensation to the image streams to mimic lighting conditions at a time of traveling the selected path.

4. The method of claim 2, wherein d) further comprises applying virtual precipitation compensation to the image streams to mimic weather conditions at a time of traveling the selected path.

5. The method of claim 1, further comprising:
   augmenting the displayed sequence of image streams with synthetic elements.

6. The method of claim 1, wherein c) further comprises:
   identifying a first position within the sequence of image streams corresponding to a current position;
   identifying a second position within the sequence of image streams corresponding to a desired position; and
   re-positioning the sequence of image streams to the second position for display, if a difference between the first and second positions exceeds a pre-determined threshold.

7. The method of claim 6 wherein the pre-determined threshold is a number representing an acceptable number of image stream frames between the first and second positions.

8. The method of claim 6, wherein identifying the second position further comprises:
   acquiring information determinative of an actual position of a user, wherein the desired position within the sequence of image streams corresponds to the actual position of the user.

9. The method of claim 6, wherein identifying the second position further comprises:
   acquiring information determinative of an actual position of a user and a corresponding actual position within the sequence of image streams; and
   calculating the desired position as an offset to the actual position within the sequence of image streams such that the desired and actual positions within the sequence of image streams are distinct.

10. The method of claim 6, further comprising:
    varying a frame rate of display of the sequence of image streams in accordance with a speed of travel of a user along the selected path.

* * * * *